(12) United States Patent
Kamada et al.

(10) Patent No.: US 8,289,471 B2
(45) Date of Patent: Oct. 16, 2012

(54) LAMP HOLDER, BACKLIGHT DEVICE AND LIQUID CRYSTAL DISPLAY DEVICE

(75) Inventors: Kentaro Kamada, Osaka (JP); Daisuke Teragawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 175 days.

(21) Appl. No.: 12/921,171

(22) PCT Filed: Mar. 6, 2009

(86) PCT No.: PCT/JP2009/054277
§ 371 (c)(1),
(2), (4) Date: Sep. 7, 2010

(87) PCT Pub. No.: WO2009/113454
PCT Pub. Date: Sep. 17, 2009

(65) Prior Publication Data
US 2011/0007237 A1    Jan. 13, 2011

(30) Foreign Application Priority Data
Mar. 12, 2008   (JP) ................................. 2008-062928

(51) Int. Cl.
G02F 1/13357 (2006.01)
G02F 1/1333 (2006.01)
F21V 21/00 (2006.01)

(52) U.S. Cl. ............ 349/58; 349/56; 362/382; 362/97.1

(58) Field of Classification Search ................. 362/97.1, 362/97.2, 97.3, 97.4, 216, 396, 382; 349/56 K, 349/58, 61, 60, 62, 113, 155, 156
See application file for complete search history.

(56) References Cited

U.S. PATENT DOCUMENTS

| | | | |
|---|---|---|---|
| 7,461,963 B2 * | 12/2008 | Ono et al. ..................... 362/614 |
| 2005/0207149 A1 * | 9/2005 | Ono et al. ..................... 362/216 |
| 2006/0066767 A1 * | 3/2006 | Kao et al. .......................... 349/58 |
| 2009/0279320 A1 | 11/2009 | Yokota et al. |
| 2011/0007237 A1 * | 1/2011 | Kamada et al. ................. 349/58 |

FOREIGN PATENT DOCUMENTS

| | | |
|---|---|---|
| JP | 2004-287226 A | 10/2004 |
| JP | 2005-203154 A | 7/2005 |
| WO | 2008/001710 A1 | 1/2008 |

OTHER PUBLICATIONS

Official Communication issued in International Patent Application No. PCT/JP2009/054277, mailed on Apr. 14, 2009.

* cited by examiner

*Primary Examiner* — Brian Healy
(74) *Attorney, Agent, or Firm* — Keating & Bennett, LLP

(57) ABSTRACT

Disclosed is a lamp holding tool provided with lamp holding sections arranged in a same direction at fixed intervals, and flat-board like connecting sections whereupon the lamp holding sections are fixed. The lamp holding section has a shape which can abut to the lamp on different parts depending on relative angles to the lamp. As for the lamp holding sections, a distance between the lamps is changed by an angle formed by the arrangement direction of the lamp holding sections and the axis direction of the lamps.

16 Claims, 14 Drawing Sheets

LAMP HOLDER, BACKLIGHT DEVICE AND LIQUID CRYSTAL DISPLAY DEVICE

TECHNICAL FIELD

The present invention relates to a lamp holder used to hold a light source, a backlight device that uses the lamp holder, and a liquid crystal display device that uses the backlight device.

BACKGROUND ART

A liquid crystal display device partially blocks light, by using a liquid crystal panel, emitted from a backlight device that is disposed on a rear-surface side of a liquid crystal cell, thereby forming an image on a front-surface side of the liquid crystal panel. The backlight device has a light source; a reflection portion disposed on a side opposite to the liquid crystal panel with respect to the light source; and a light diffusion portion that is disposed between the light source and the liquid crystal panel and diffuses light emitted from the light source and light reflected by the reflection portion.

In recent years, a liquid crystal display device that uses a large liquid crystal panel is widespread; and in the backlight device which uses a lamp as the light source, a plurality of lamps that are so arranged to be parallel with each other are employed. Besides, in the backlight device, the lamp is held by means of a member that is called a lamp holder.

A conventional liquid crystal display device is described in more detail with reference to drawings. FIG. 13 is a front view showing innards of a backlight device with a front portion of the liquid crystal display device omitted; FIG. 14 is a sectional view of the conventional liquid crystal display device.

The liquid crystal display device is formed by mounting a liquid crystal panel unit DP to a backlight device BL. As shown in FIG. 13, the liquid crystal display device is formed by combining the liquid crystal panel DP and the backlight device BL that has a shield 1; a reflection plate 2; a lamp 3; a lamp holder 95; and a diffusion plate 4. The lamp holder 95 has: a pair of lamp holders 951 that hold the lamp 3; a connection portion 952 from an upper surface of which the lamp holder 951 protrudes and to which the lamp holder 951 is connected; and an engagement portion 953 that is protruded from a lower surface of the connection portion 952.

The backlight device is assembled as described hereinafter. First, the reflection plate 2 is accurately positioned and disposed at a predetermined position of a bottom surface of the shield 1. At this time, holes (not shown) formed through the shield 1 and the reflection plate 2 lie on each other; the engagement portion 953 of the lamp holder 95 is inserted into and engaged with the through-hole, so that the lamp holder 95 is fixed to the shield 1.

The lamp 3 is held by the lamp holder 951 of the lamp holder 95 that is fixed to the shield 1. The lamp holder 951 has a cylindrical in which part of a circumferential side portion thereof is cut away; and the cut-away portion is formed upward. The width of the cut-away portion is widened and the lamp 3 is inserted; and the width of the cut-away portion is returned back to the original width, so that it is possible to surely hold the lamp 3.

On the other hand, the liquid crystal panel unit is formed by mounting and fixing the backlight device to a rear-surface side of the liquid crystal panel DP having a frame, so that the liquid crystal display device is formed. As shown in FIGS. 13, 14, in the backlight device, a plurality of lamps 3 are so arranged as to have an equal interval.

However, in a large liquid crystal display device, many lamps 3 are necessary to obtain sufficient brightness. If the number of lamps 3 increases, more electric power becomes necessary to turn on the lamps 3 and the amount of radiated heat increases. Because the amount of radiated heat increases, constituent members such as the reflection plate 2, the diffusion plate 4 and the like are changed in quality and deformed in some cases. Because of the quality change of the reflection plate 2, the diffusion plate 4 and the like, unevenness occurs in the light emitted from the rear surface of the liquid crystal panel DP, so that in some cases, a disadvantage sometimes occur, in which the quality of an image formed by the liquid crystal panel DP deteriorates.

To solve the disadvantages, as disclosed in JP-A-2004-287226, changing the disposition interval (pitch) of the lamp 3, which has been an equal interval so far, to an unequal pitch is proposed.

In a liquid crystal display device in which the lamps are disposed at an unequal pitch, the lamps 3 at the central portion are disposed at narrow intervals and the lamps 3 at the outsides are disposed at wide intervals. As described above, in a liquid crystal display device that uses a large liquid crystal panel, by changing the disposition pitch of the lamp 3 to an unequal pitch, it is possible to curb a dramatic increase in the consumed power and obtain sufficient brightness, and occurrence of brightness unevenness is reduced.

Patent document 1: JP-A-2005-203154
Patent document 1: JP-A-2004-287226

DISCLOSURE OF THE INVENTION

Problems to be Solved by the Invention

As described above, in the liquid crystal display device, the lamp holder 95 is used to hold two lamps 3 at the same time; in a case where the disposition pitches of the lamps 3 are different, it is necessary to prepare the lamp holder 95 that matches the disposition pitch. However, the lamp holder 95 is unitarily formed with a resin; to fabricate the lamp holders 95 that have different disposition pitches, different molds for dealing with the respective disposition pitches are necessary, so that the production processes increase all the more and the production efficiency becomes low.

Besides, to curb brightness unevenness, the lamp holder 95 is formed with an even white resin in many cases, so that it is hard to quickly identify the kind. Because of this, in a case where the lamp holder 95 is necessary for every pitch, it takes much trouble and a long time to identify the lamp holder 95 in an assembly time, so that the production efficiency of the backlight device becomes low. Besides, there is a case where nobody notices even if the lamp holder 95 having a wrong disposition pitch is mounted; and a stress acts on the lamp 3 in a direction to break the lamp 3. In this way, if an excessive force acts on the lamp 3, a disadvantage is likely to occur, in which brightness unevenness occur and the lamp 3 is broken.

To solve the above disadvantages, it is an object of the present invention to provide a lamp holder that holds a plurality of light sources and is capable of holding the light sources without allowing an unnecessary force to act on the light source even if the interval between the light sources changes.

Besides, it is an object of the present invention to provide: a backlight device that curbs increase in the kinds of constituent members, reduces processes required for the production, curbs occurrence of misuses of members in an assembly time, and is capable of improving the production efficiency all the more; and a liquid crystal display device that uses the backlight device.

Means for Solving the Problem

To achieve the above object, it is an object of the present invention to provide a lamp holder including: a plurality of lamp holders that are arranged in a same direction at predetermined intervals and hold a cylindrical lamp; and a flat-plate-like connection portion to which the plurality of lamp holders are fixed; the lamp holder holds a plurality of lamps in such a way that the plurality of lamps become parallel with each other; wherein the lamp holder has a shape to come into contact with the lamp at a different portion in accordance with a relative angle to the lamp; and a distance between the lamps is changed in accordance with an angle between an arrangement direction of the lamp holder and an axis direction of the lamp.

According to this structure, it is possible to hold the plurality of lamps that have different lamp arrangement interval (lamp pitch) by means of a less number of kinds of lamp holders than the number of kinds of the lamps.

In this way, in the device (backlight device and the like) that disposes the lamps with the different lamp pitches, it is possible to reduce production processes compared with the conventional device that has a lamp holder for every lamp pitch. In this way, it is possible to reduce occurrence of wasted members.

Besides, because it is possible to use a common lamp holder irrespective of the lamp pitches, it is possible to eliminate the time and trouble to identify the lamp holder in an assembly time. Besides, because it becomes easy to identify the lamp holder, it is possible to prevent wrong mounting of the lamp holder and curb occurrence of disadvantages such as defective mounting of the lamp, occurrence of brightness unevenness due to action of an excessive stress onto the lamp, and lamp breakage.

In the above structure, the lamp holder may be capable of holding the lamp in such a way that at least the arrangement direction of the lamp holder and the axis direction of the lamp meet each other at right angles. According to this structure, because it is possible to effectively use the distance between the lamp holders, it is possible to form the lamp holder to have a small structure.

In the above structure, an engagement portion for mounting the lamp holder to a mounting portion may be protruded at a position of a surface that is opposite to a surface of the connection portion where the lamp holder is mounted and corresponds to the lamp holder. Because a plurality of the engagement portions are mounted, it is possible to stably mount the lamp holder.

In the above structure, the lamp holder is disposed in parallel with the connection portion and has a shape in which a plurality of linear cylindrical portions, which have a cut-away portion extending in the axis direction in a place opposite to the connection portion, are connected to each other in such a way that the plurality of linear cylindrical portions deviate from each other by a predetermined angle and intersect with each other; and the cut-away portions of the respective cylindrical portions are connected to each other, so that an opening portion extending in a longitudinal direction of the lamp holder is formed.

As the lamp holder, it is possible to represent a lamp holder that has a shape in which two cylindrical portions, which have an inner diameter equal to an outer diameter of the lamp, are connected to each other in such a way that the two cylindrical portions deviate from each other by a predetermined angle and intersect with each other.

As the lamp holder, it is possible to represent a lamp holder in which at least one of the plurality of cylindrical portions has an inner diameter smaller than an outer diameter of the lamp; and the inner diameter of the cylindrical portion is so small as not to allow a stress, which acts on the lamp because of deformation of the lamp holder, to cause trouble with the lamp.

The lamp holder of the lamp holder having the above structure has a cylindrical portion whose at least one end portion is formed to be curved and which is disposed in parallel with the connection portion; and includes an opening portion on an opposite side with respect to the curved direction.

According to this structure, the portion of the lamp holder that is formed to be curved is always able to include a point to come into contact with the lamp in accordance with an inclination angle of the lamp holder. Because of this, it is possible to include the plurality of lamp pitches in a predetermined range by adjusting the inclination angle of the lamp holder.

In the above structure, both end portions of the lamp holder may be formed to be curved in such a way that the lamp holder becomes line-symmetrical with respect to a central portion thereof. According to this structure, it is possible to obtain the same lamp pitch by rotating the lamp holder in whichever direction of a clockwise direction or a counterclockwise direction when seen from the front.

As a device that includes the lamp holder, it is possible to represent a backlight device. Moreover, a shield to which the lamp holder is fixed and a light reflection portion disposed on a front-surface side of the shield are provided with an engagement hole for mounting the engagement portion; and the engagement holes of the shield and the light reflection portion may be so arranged in a direction inclined to the axis direction of the lamp as to match an interval between the lamps. According to this structure, because it is possible to obtain a desired lamp pitch irrespective of the shape of the lamp holder by inserting the engagement portion into the engagement hole, it is possible to eliminate the trouble in an assembly time.

As a device that includes the backlight device, it is possible to represent a liquid crystal display device.

Advantages of the Invention

According to the present invention, it is possible to provide a lamp holder that holds a plurality of light sources and is capable of holding the light sources without allowing an unnecessary force to act on the light source even if the interval between the light sources changes.

Besides, according to the present invention, it is possible to provide: a backlight device that curbs increase in the kinds of constituent members, reduces processes required for the production, curbs occurrence of misuses of members in an assembly time, and is capable of improving the production efficiency all the more; and a liquid crystal display device that uses the backlight device.

LIST OF REFERENCE SYMBOLS

Figure 1:
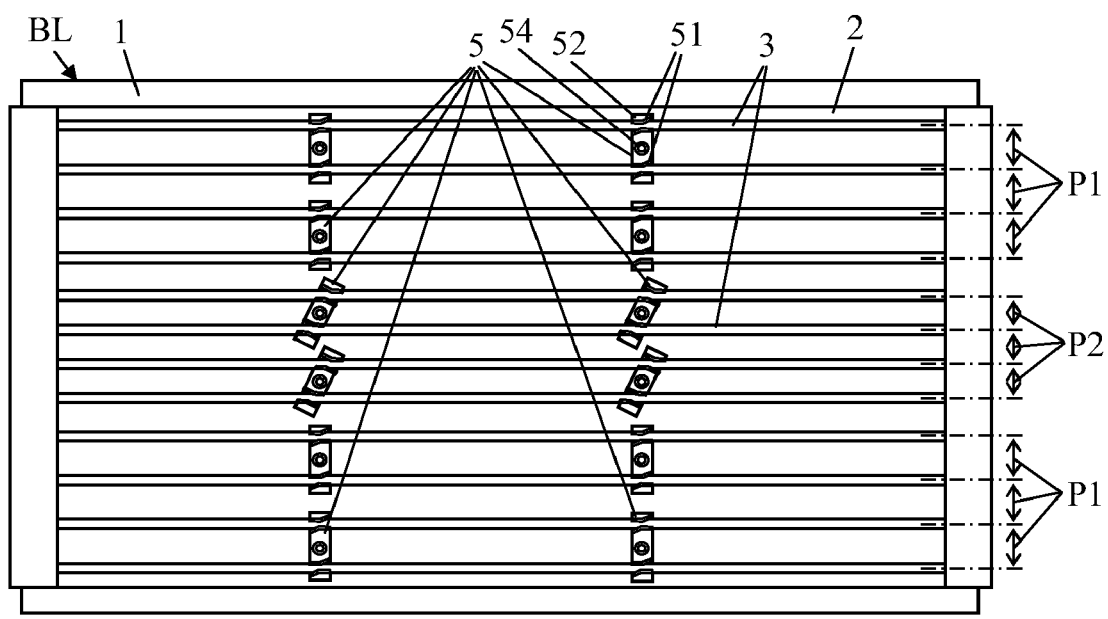
FIG. 1 is a front view showing innards of a backlight device with a front portion of an example of a liquid crystal display device according to the present invention omitted.

BL backlight device
1 shield
10 engagement hole
2 reflection plate
20 engagement hole
3 lamp
4 diffusion plate
5 lamp holder
51 lamp holding portion
510 bottom-surface portion
511 first lamp holding portion
512 second lamp holding portion
514 opening portion
515 column-shape portion
52 connection portion
54 diffusion-plate strut
6 lamp holder
61 lamp holding portion
610 bottom-surface portion
611 first lamp holder
612 second lamp holding portion
613 third lamp holding portion
614 opening portion
615 column-shape portion
62 connection portion
63 engagement portion
64 diffusion-plate strut
7 lamp holder
71 lamp holding portion
710 bottom-surface portion
711 linear-shape lamp holding portion
712 curve-shape lamp holding portion
714 opening portion
715 column-shape portion
72 connection portion
73 engagement portion
74 diffusion-plate strut
8 lamp holder
81 lamp holding portion
814 opening portion
815 column-shape portion
82 connection portion
83 engagement portion
84 diffusion-plate strut
DP liquid crystal panel

BEST MODE FOR CARRYING OUT THE INVENTION

Hereinafter, a liquid crystal display device according to the present invention is described with reference to drawings.

Figure 2:
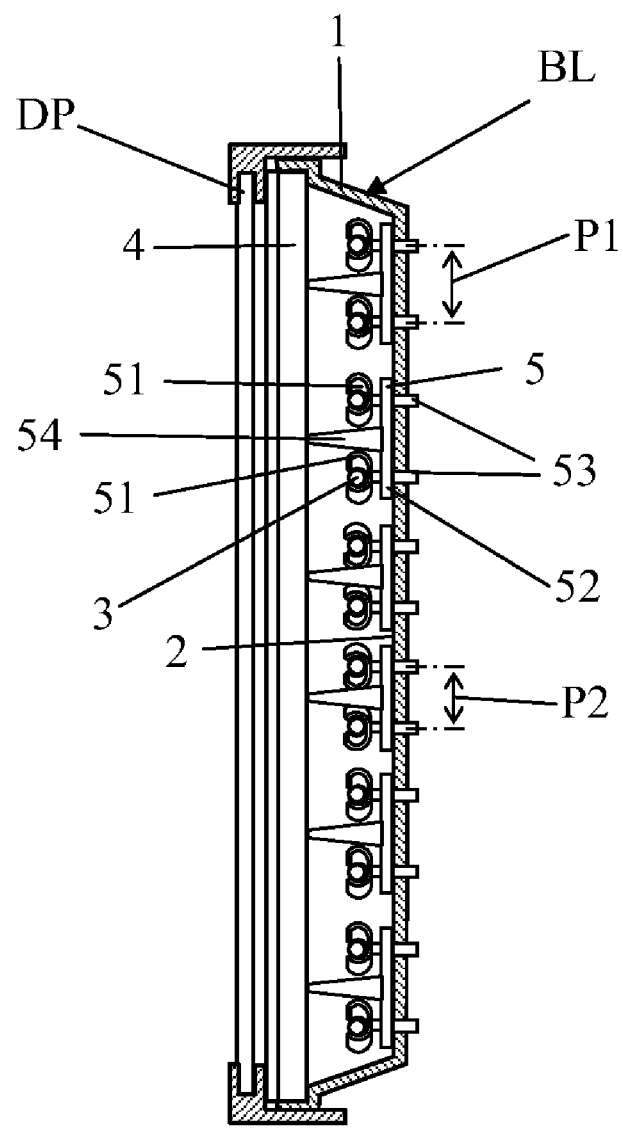
FIG. 2 is a sectional view of an example of a liquid crystal display device according to the present invention.

FIG. 1 is a front view showing innards of a backlight device with a front portion of an example of a liquid crystal display device according to the present invention omitted; FIG. 2 is a sectional view of an example of the liquid crystal display device according to the present invention.

As shown in FIG. 1 and FIG. 2, the liquid crystal display device has a backlight device BL and a liquid crystal panel DP. The liquid crystal display device is assembled by mounting and fixing the liquid crystal panel DP, to which a frame is mounted, to a front-surface side of the backlight device BL.

The backlight device BL includes at least; a shield 1; a reflection plate 2; a lamp 3; a diffusion plate 4; and a lamp holder 5. The shield 1 is a rectangular housing whose front-surface side is opened, and in which the reflection plate 2 and a plurality of lamps 3 are disposed. The reflection plate 2 reflects light emitted from the lamp 3 and is a sheet-shape member that has a white reflection surface. The reflection plate 2 is accurately positioned and disposed at a predetermined position of a bottom surface of the shield 1. Here, an engagement hole 10 formed through the shield 1 and an engagement hole 20 formed through the reflection plate 2 lie on each other; and the lamp holder 5 is fixed by inserting and engaging an engagement portion 53 described later into and with the engagement hole 10 and the engagement hole 20.

The lamp 3 serves as a light source of the liquid crystal display device and a cold-cathode fluorescent lamp (CCFL) is used here although not limited to this. The lamp 3 is held at both end portions thereof and at several points of the central portion thereof by the lamp holder 5. As shown in FIG. 1, the lamp 3 is so disposed as to be parallel with the longer edge of the shield 1; and a plurality of lamps 3 are so arranged as to be parallel with each other in the shorter-edge direction.

Moreover, as shown in FIG. 1 and FIG. 2, the distance (lamp pitch) between adjacent lamps 3 is a wide pitch P1 on the side portion and a narrow pitch P2 at the central portion. According to this disposition, even if the liquid crystal panel DP becomes large, it is possible to curb brightness deterioration and occurrence of brightness unevenness without increasing the number of lamps 3.

As shown in FIG. 2, the diffusion plate 4 is so disposed on the font-surface side of the shield 1 as to cover an open portion. The diffusion plate 4 is able to diffuse the light emitted from the lamp 3 and the light that is emitted from the lamp 3 and reflected by the reflected plate 2, thereby making the brightness even or substantially even on the same surface.

First Embodiment

Figure 3:
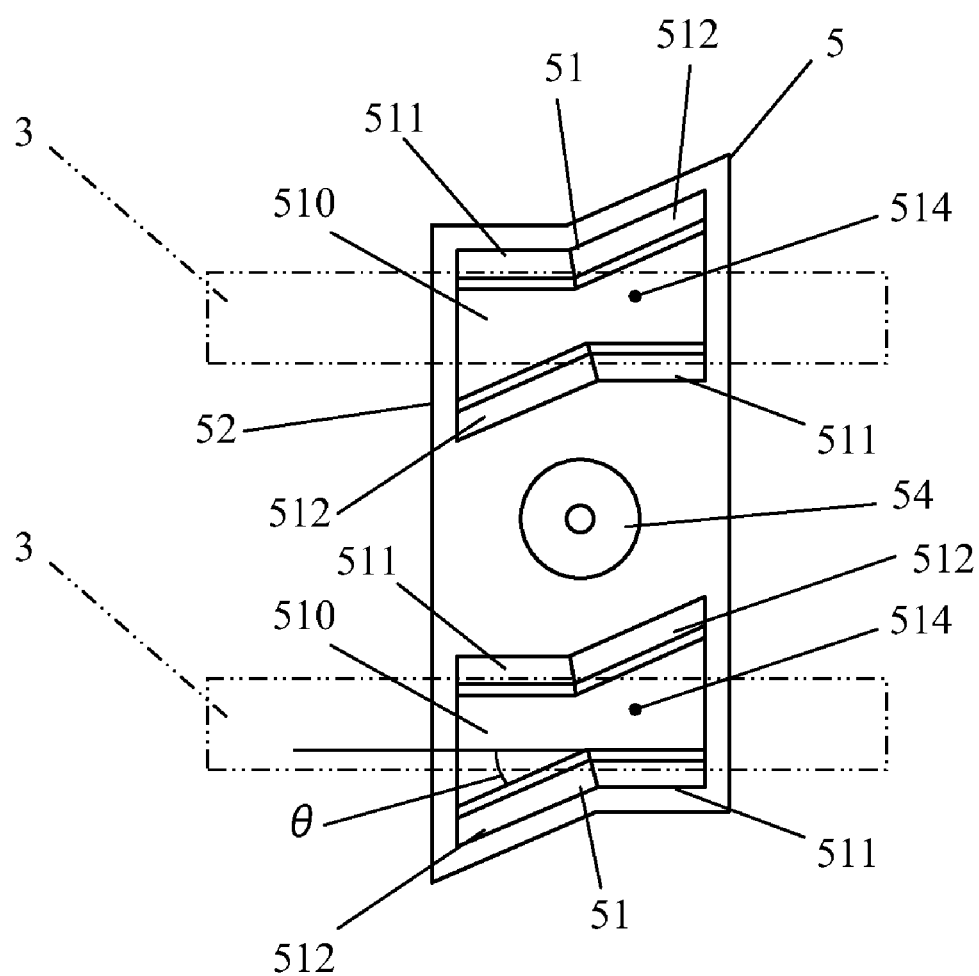
FIG. 3 is a front view of an example of a lamp holder according to the present invention.
Figure 4:
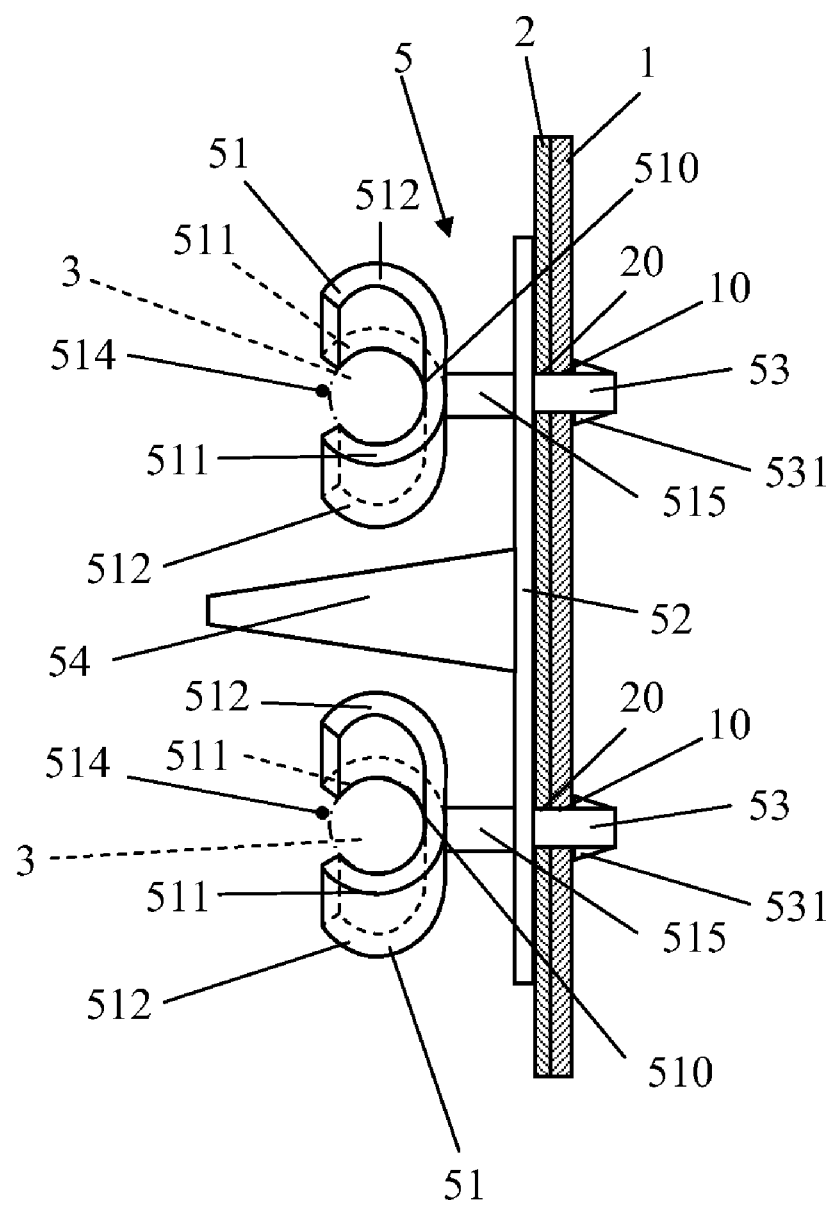
FIG. 4 is a side view of the lamp holder shown in FIG. 3.

A lamp holder according to the present invention is described in detail. FIG. 3 is a front view of an example of the lamp holder according to the present invention; FIG. 4 is a side view of the lamp holder shown in FIG. 3. As shown in FIG. 3 and FIG. 4, the lamp holder 5 has: a pair of lamp holding portions 51 that hold the lamp 3; a flat-plate-like connection portion 52 that connects the lamp holding portion 51; a pair of engagement portions 53 that are protruded from a lower surface of the connection portion 52; and a diffusion-plate strut 54 that is disposed between the pair of lamp holding portions 51. The lamp holder 5 is unitarily fabricated with a white resin that has elasticity although not limited to this.

The pair of lamp holding portions 51 are arranged in the same direction as a longitudinal direction of the connection portion 52. The lamp holding portion 51 has the same outer diameter and inner diameter; connect two cylindrical portions, which have a cut-away portion extending over the total length of an axis direction, to each other in such a way that the two cylindrical portions intersect with each other; and the portion where the cut-away portions intersect with each other is formed as an opening portion.

As shown in FIG. 3, the lamp holding portion 51 has: a bottom-surface portion 510 that is formed in parallel with the connection portion 52; a pair of first lamp holding portions 511 that are connected to an end portion of the bottom-surface portion 510 and extended in a direction that meets an arrangement direction of the lamp holding portion 51 at right angles; and a pair of second lamp holding portions 512 that are connected to an end portion of the bottom-surface portion 510 and extended in a direction inclined toward the first lamp holding portion 511 by an angle θ.

The first lamp holding portion 511 and the second lamp holding portion 512 have a shape that is formed by cutting a cylinder having an inner diameter equal to an outer diameter of the lamp in such a way that the cylinder has a predetermined central angle. The first lamp holding portion 511 is connected to the bottom-surface portion 510 and the second lamp holding portion 512 is connected to the bottom-surface portion 510. As shown in FIGS. 3 and 4, the lamp holding portion 51 is discontinuous at part thereof and the part forms an opening portion 514 into which the lamp 3 is inserted.

The pair of first lamp holding portions 511 hold part of an outer circumference of the lamp 3 to cover the part from sides opposite to each other. The pair of first lamp holding portions 511 are so disposed as to be deviated in the axis direction of the lamp 3 held. The pair of first lamp holding portions 512 also likewise hold part of the outer circumference of the lamp 3 to cover the part from sides opposite to each other (see FIG. 4). The pair of first lamp holding portions 512 are so disposed as to be deviated in the axis direction of the lamp 3 held.

Mounting of the lamp 3 onto the lamp holder 5 is performed as described hereinafter. The lamp 3 is disposed at the opening portion 514 and pushed toward the lamp holding portion 51 side. When the lamp 3 passes, the first lamp holding portion 511 or the second lamp holding portion 512 is widely opened and elastically returns to the original state after the lamp 3 passes the opening portion 514, thereby holding side portions of the lamp 3.

The first lamp holding portion 511 and the second lamp holding portion 512 are connected to each other; as shown in FIG. 3, the lamp holding portion 51 is so formed as to become point-symmetrical when seen from a front-surface side. The bottom-surface portion 510 of the lamp holding portion 51 and the connection portion 52 are connected to each other by means of a column-shape portion 515.

The engagement portion 53 is protruded here from a surface of the connection portion 52 opposite to the lamp holding portion 51 although not limited to this. The engagement portion 53 is a cylindrical member and a lock piece 531 is formed on a side circumferential surface. The engagement portion 53 penetrates the engagement hole 10 formed through the shield 1 and the lock piece 531 expands, so that the lamp holder 5 is fixed to the shield 1. Here, the distance between the engagement portions 53 of the pair is so formed as to be equal to the wide pitch P1 for convenience. Besides, the wide pitch is not limiting.

The diffusion-plate strut 54 is a column-shape member that supports a surface of the diffusion plate 4 that faces the lamp 3 to prevent the diffusion plate 4 from being deformed because of its weight, vibration and the like when the diffusion plate 4 is mounted to the shield 1. By preparing the diffusion-plate strut 54, because it is possible to curb considerable deformation of the diffusion plate 4, it is possible to curb occurrence of brightness unevenness due to flexure, torsion and the like of the diffusion plate 4.

Figure 5:
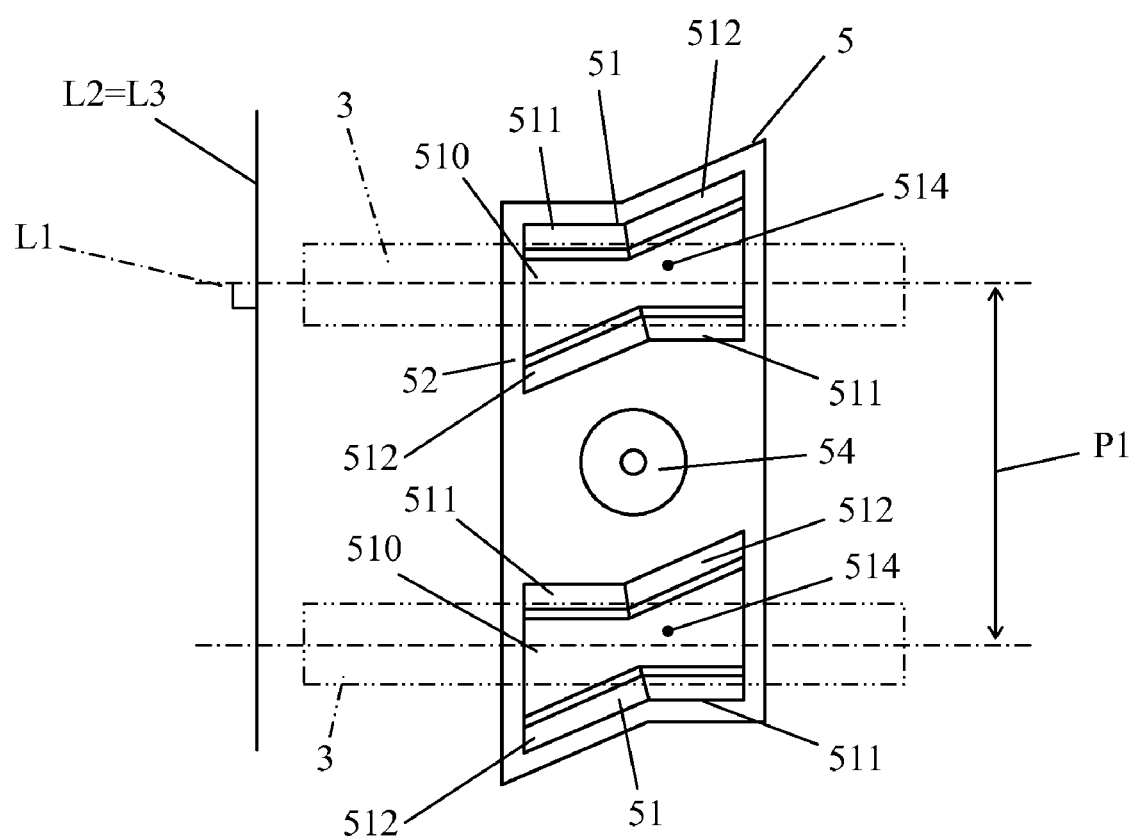
FIG. 5 is a front view showing a state where two lamps having a wide lamp pitch are held by the lamp holder shown in FIG. 3.
Figure 6:
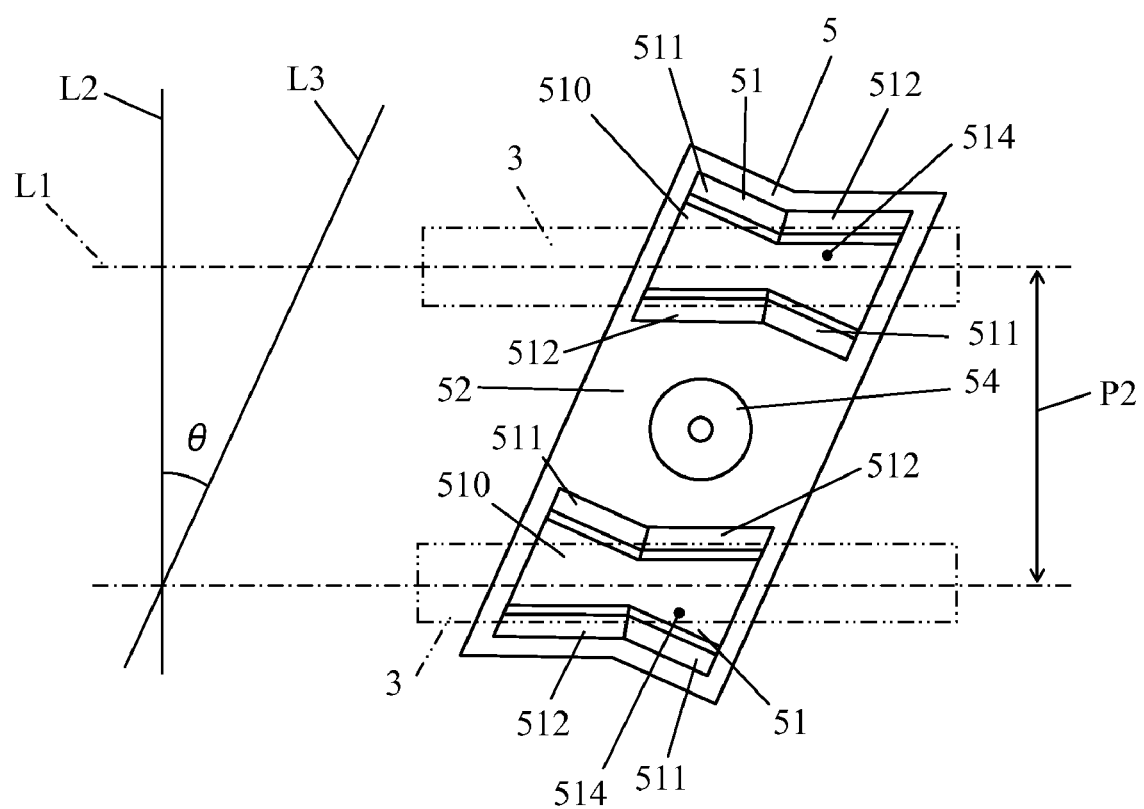
FIG. 6 is a front view showing a state where two lamps having a narrow lamp pitch are held by the lamp holder shown in FIG. 3.

The method for holding the lamp 3 by using the lamp holder 5 is described in more detail. FIG. 5 is a front view showing a state where two lamps having a wide lamp pitch are held by the lamp holder shown in FIG. 3; FIG. 6 is a front view showing a state where two lamps having a narrow lamp pitch are held by the lamp holder shown in FIG. 3. Here, for convenience, the axis direction of the lamp 3 is indicated by a dash-dotted line L1; a line that meets the axis direction of the lamp 3 at right angles is indicated by a solid line L2; and the arrangement direction of the lamp holding portion 51 is indicated by a solid line L3. In the following embodiments as well, a similar line is drawn.

In FIG. 5, the lamp holder 5 is disposed in such a way that the arrangement direction of the lamp holding portion 51 meets the axis direction of the lamp 3 at right angles. By disposing the lamp holder 5 in this way, it is possible to hold the lamp 3 that is disposed at the wide pitch P1 as the lamp pitch. Besides, as shown in FIG. 6, the lamp holder 5 is disposed in such a way that the arrangement direction of the lamp holding portion 51 is deviated by an angle θ from the line that meets the axis direction of the lamp 3 (in other words, deviated by the angle θ from the lamp holder 5 shown in FIG. 5) at right angles. In this way, it is possible to change the lamp pitch from the wide pitch P1 to the narrow pitch P2 without changing the relative distance between the lamp holding portions 51.

Figure 7:
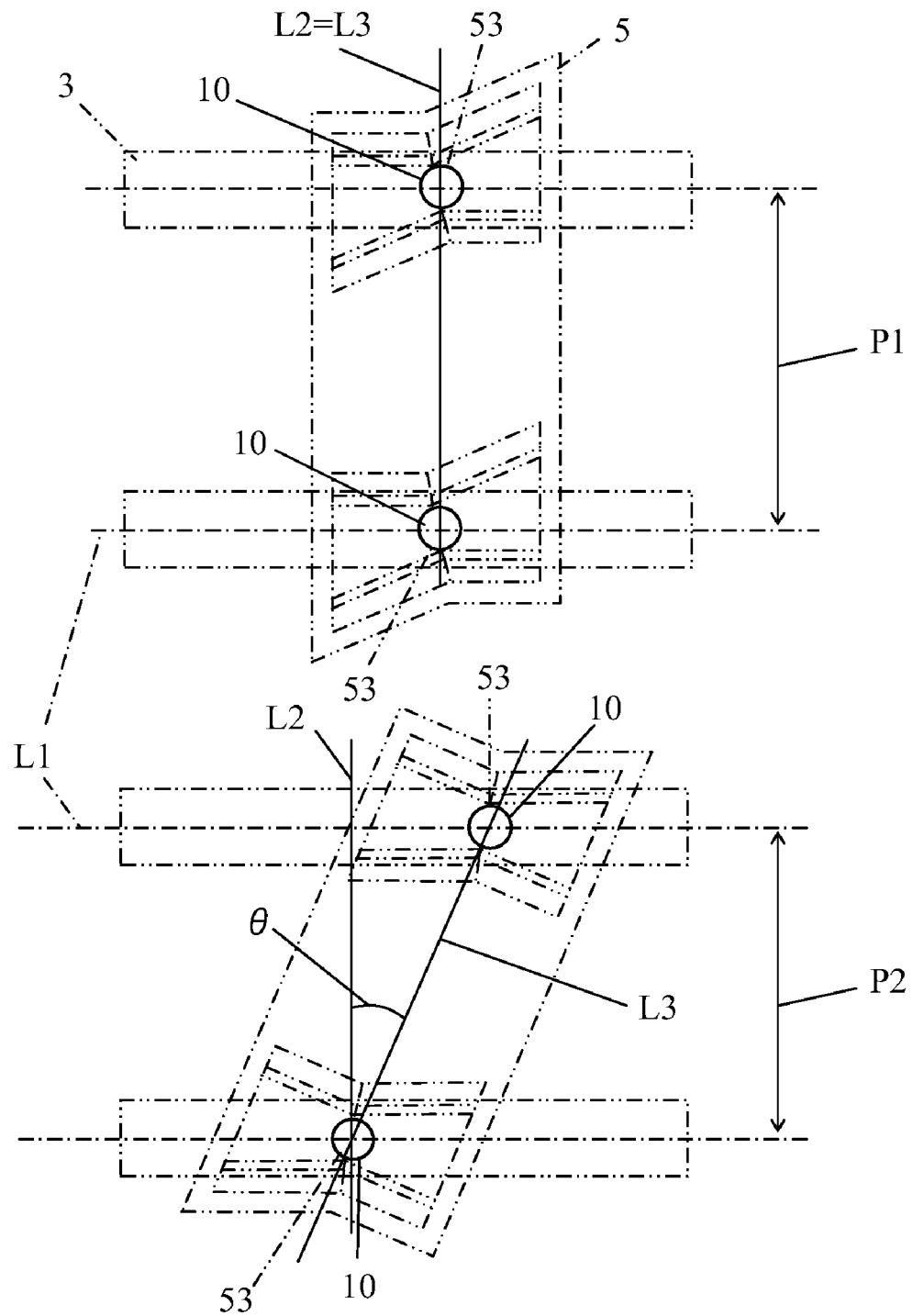
FIG. 7 is an enlarged view of an engagement-hole portion of a shield used for a backlight device according to the present invention.

In other words, it is possible to hold the lamp 3 whose lamp pitch is the wide pitch P1 and the lamp 3 whose lamp pitch is the narrow pitch P1 by means of one kind of lamp holder 5. To hold the lamps 3 having different lamp pitches, the shield 1 and the reflection plate 2 are devised. FIG. 7 is an enlarged view of an engagement-hole portion of the shield used for the backlight device according to the present invention. Here, the reflection plate 2 is not shown in FIG. 7; however, the reflection plate 2 also is disposed in the backlight device BL.

First, as shown in FIG. 1, in the backlight device BL, the lamps 3 are so disposed as to have the wide pitch P1 on the outside and the narrow pitch P2 at the central portion. As described above, when the backlight device BL is assembled, the engagement portion 53 of the lamp holder 5 is inserted into the engagement hole 10 formed through the shield 1; the lock piece 531 of the engagement portion 53 expands, so that the lamp holder 5 is so fixed to the shield 1 as not to come off.

In the place on the side portion of the shield 1 where the lamp 3 is disposed at the wide pitch P1, the pair of engagement holes 10 are formed through the places that correspond to the places where the lamp holder 5 is disposed. Here, the engagement holes 10 are disposed side by side in the direction that meets the axis direction of the lamp 3 at right angles. By inserting and engaging the pair of engagement portions 53 into and with the pair of engagement holes 10, the lamp holder 5 is mounted in such a way that the lamp pitch becomes the wide pitch P1.

Besides, as shown in FIG. 7, in the place of the central portion of the shield 1 where the lamp 3 is disposed at the narrow pitch P2, the arrangement direction of the pair of engagement holes 10 is so formed as to be inclined by an angle θ toward the line that meets the axis line of the lamp 3 at right angles. By inserting and engaging the engagement portion 53 of the lamp holder 5 into and with the engagement hole 10, the lamp holder 5 is deviated by the angle θ and mounted in such a way that the lamp pitch becomes the narrow pitch P2.

As described above, in the backlight device BL, by inserting the pair of engagement portions 53 into the pair of engagement holes 10 formed through the shield 1, the lamp holder 5 is mounted to the shield 1. The mounting is performed in this way, so that it is possible to accurately adjust the lamp pitches (P1, P2) by using the lamp holder 5.

Because of this, it is possible to reduce the trouble and processes required for the production of the lamp holder compared with the case where the lamp holders having different lamp pitches are used. Besides, in an assembly time, because it is not necessary to select the lamp holder, it is possible to eliminate the trouble of assembling and shorten the assembly time all the more. Moreover, it is possible to curb occurrence of mistakes of mounting a lamp holder that has a wrong lamp pitch and to curb action of an unexpected stress onto the lamp 3. In this way, it is possible to curb occurrence of disadvantages that the brightness of the lamp 3 does not become even and the lamp 3 is broken at the worst.

Here, in the present embodiment, illustration of the reflection plate 2 disposed in the shield 1 is omitted; however, the reflection plate 2 also is provided with the engagement hole 20 at a position that corresponds to the engagement hole 10 when the reflection plate 2 is mounted to the shield 1. It is preferable that the engagement hole 20 has a size equal to or slightly larger than the engagement hole 10. It is preferable that the engagement hole 10 and the engagement hole 20 are hidden by the connection portion 52 and become invisible when the lamp holder 5 is mounted to the shield 1. This is because if the engagement hole 20 extends beyond the engagement portion 53, part of the reflection plate 2 is not covered, so that brightness unevenness is likely to occur in the reflected light at the reflection plate.

Second Embodiment

Figure 8:
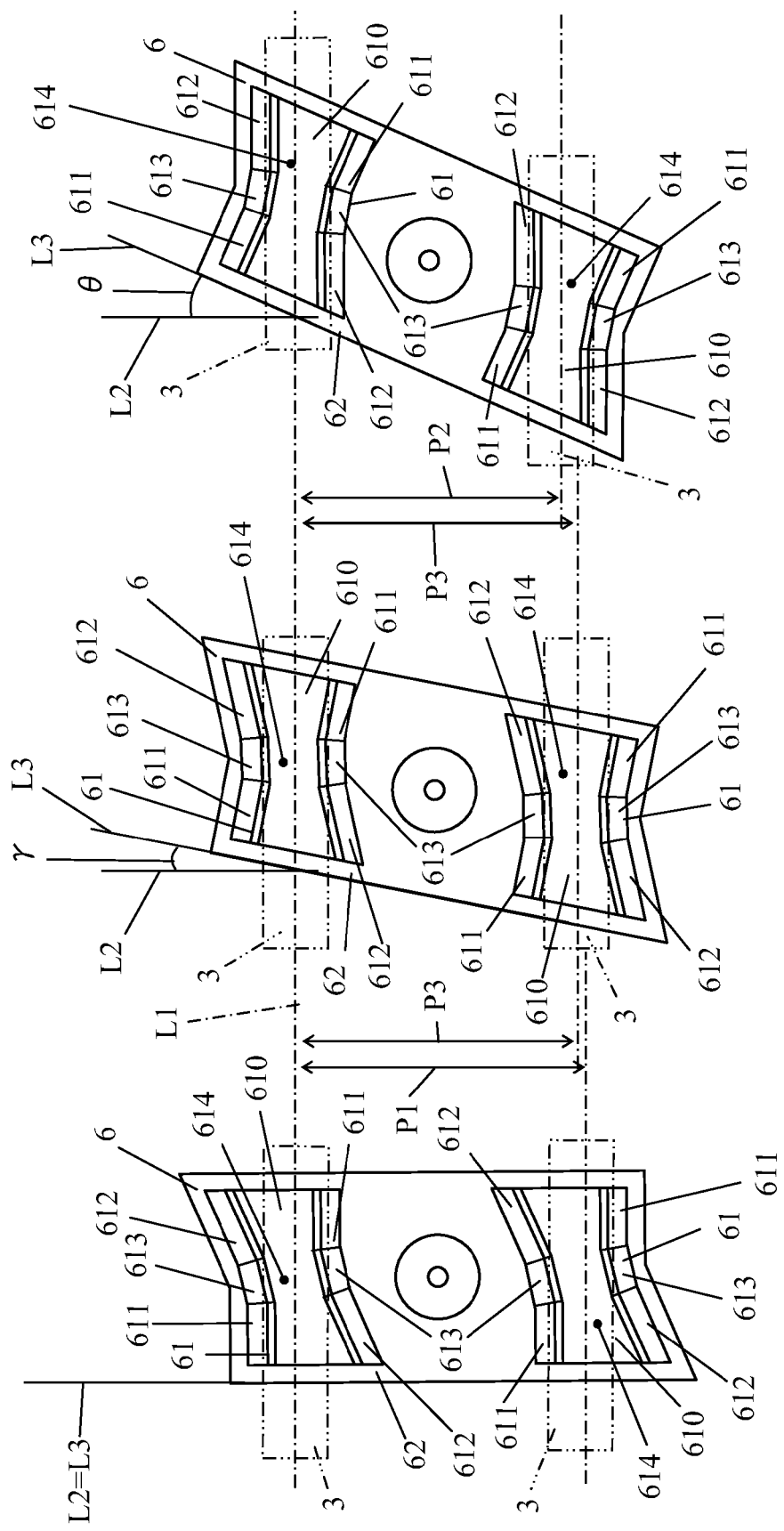
FIG. 8 is a front view showing arranged states where lamps having three kinds of lamp pitches are held by using another example of a lamp holder according to the present invention.

FIG. 8 is a front view showing arranged states where lamps having three kinds of lamp pitches are held by using another example of a lamp holder according to the present invention. A lamp holder 6 according to the present embodiment has the same structure as the lamp holder 5 shown in the embodiment 1 except that a lamp holding portion 61 includes: a first lamp holding portion 611; a second lamp holding portion 612; a third lamp holding portion 613; and details are omitted. The lamp holder 6 is unitarily fabricated with a resin that has elasticity. FIG. 8 shows an example in which the lamp holders 6 are so disposed as to deal with the three kinds of lamp pitches; and so disposed side by side as to represent the width of the lamp pitch. However, in an actual backlight device, the lamp holders are not disposed side by side unlike in FIG. 8.

As shown in FIG. 8, the lamp holder 6 includes: the lamp holding portion 61; a connection portion 62; and an engagement portion 63. The lamp holding portion 61 includes: a bottom-surface portion 610; a pair of first lamp holding portions 611 that are protruded from an end portion of the bottom-surface portion 610 and are extended in a direction which meets an arrangement direction of the lamp holding portion 61 at right angles; a pair of second lamp holding portions 612 that are extended in a direction which is inclined by an angle θ toward the first lamp holding portion 611; and a pair of third lamp holding portions 613 that are extended in a direction which is inclined by an angle γ toward the first lamp holding portion 611. Here, the angle θ is larger than the angle γ.

In the lamp holding portion 61, the first lamp holding portion 611, the third lamp holding portion 613 and the second lamp holding portion 612 are connected in this order. The third lamp holding portion 613 has an inner diameter larger than the first lamp holding portion 611 and the second lamp holding portion 612; and is so formed as to have an inner diameter equal to the outer diameter of the lamp 3.

The first lamp holding portion 611 is able to hold the lamp 3 that is disposed at the wide pitch P1; the second lamp holding portion 612 is able to hold the lamp 3 that is disposed at the narrow pitch P2. The third lamp holding portion 613 is able to hold the lamp 3 that is disposed at an intermediate pitch P3 that is a lamp pitch between the wide pitch P1 and the narrow pitch P2.

First, a case where the lamp 3 arranged at the intermediate pitch P3 as the lamp pitch is held is described. As shown in the central drawing in FIG. 8, a longitudinal direction of the engagement portion 63 of the lamp holder 6 is so disposed as to be inclined by the angle of γ toward the direction which meets the axis direction of the lamp 3 at right angles. In this way, the third lamp holding portion 613 extends in the axis direction of the lamp 3. According to this disposition, it is possible to hold the lamp 3 that is disposed at the intermediate pitch P3. Here, because the inner diameter of an inner circumferential surface of the third lamp holding portion 613 is equal to the outer diameter of the lamp 3, it is possible to hold the lamp 3 in a state without a wobble.

If the connection portion 62 is disposed in such a way that the longitudinal direction meets the axis direction of the lamp 3 at right angles (see the left drawing in FIG. 8), the first lamp holding portion 611 extends in the axis direction of the lamp 3. According to this disposition of the lamp holder 6, it is possible to hold the lamp 3 that is disposed at the wide pitch P1.

Moreover, by so disposing the arrangement direction of the lamp holding portion 51 as to be deviated by the angle θ from the direction that meets the axis direction of the lamp 3 at right angles, the second lamp holding portion 612 extends in the axis direction of the lamp 3. According to this disposition of the lamp holder 6, it is possible to hold the lamp 3 that is disposed at the narrow pitch P2 (see the right drawing in FIG. 8).

The inner diameters of inner circumferential surfaces of the first lamp holding portion 611 and the second lamp holding portion 612 are formed smaller than the outer diameter of the lamp 3. Because the lamp holder 6 is formed of a resin that has elasticity, the first lamp holding portion 611 and the second lamp holding portion 612 become deformed, so that it is possible to hold the lamp 3. Here, the first lamp holding portion 611 and the second lamp holding portion 612 are formed in such a way that elastic force due to the deformation does not hinder the lamp 3 from emitting light.

Here, in the present embodiment, the lamp holder 6, which is able to deal with the three kinds of pitches of the wide pitch, the narrow pitch and the intermediate pitch, is disclosed; however, the lamp holder 6 is not limited to the three kinds of pitches. A plurality of kinds of angles to the first lamp holder may be prepared in a range where a stress that acts on the lamp 3 because of the deformation of the lamp holder is a predetermined force or smaller when the lamp 3 is held.

Third Embodiment

Figure 9:
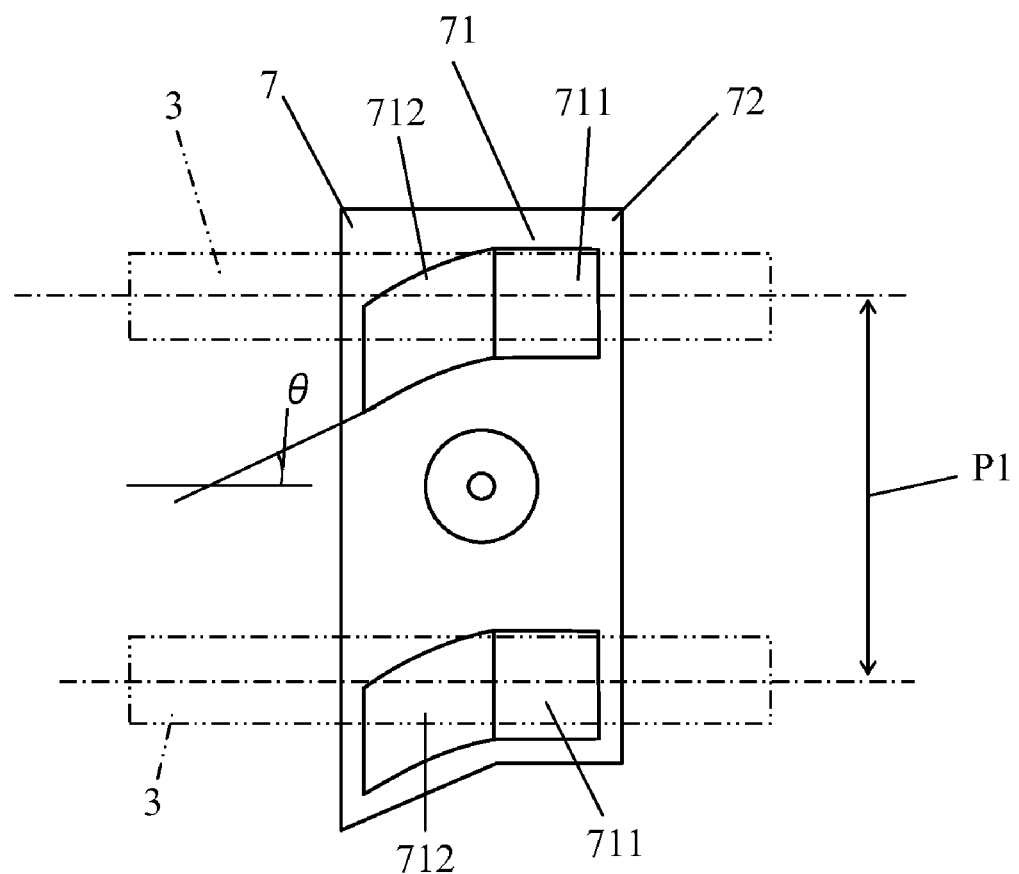
FIG. 9 is a front view of a still another example of a lamp holder according to the present invention.
Figure 10:
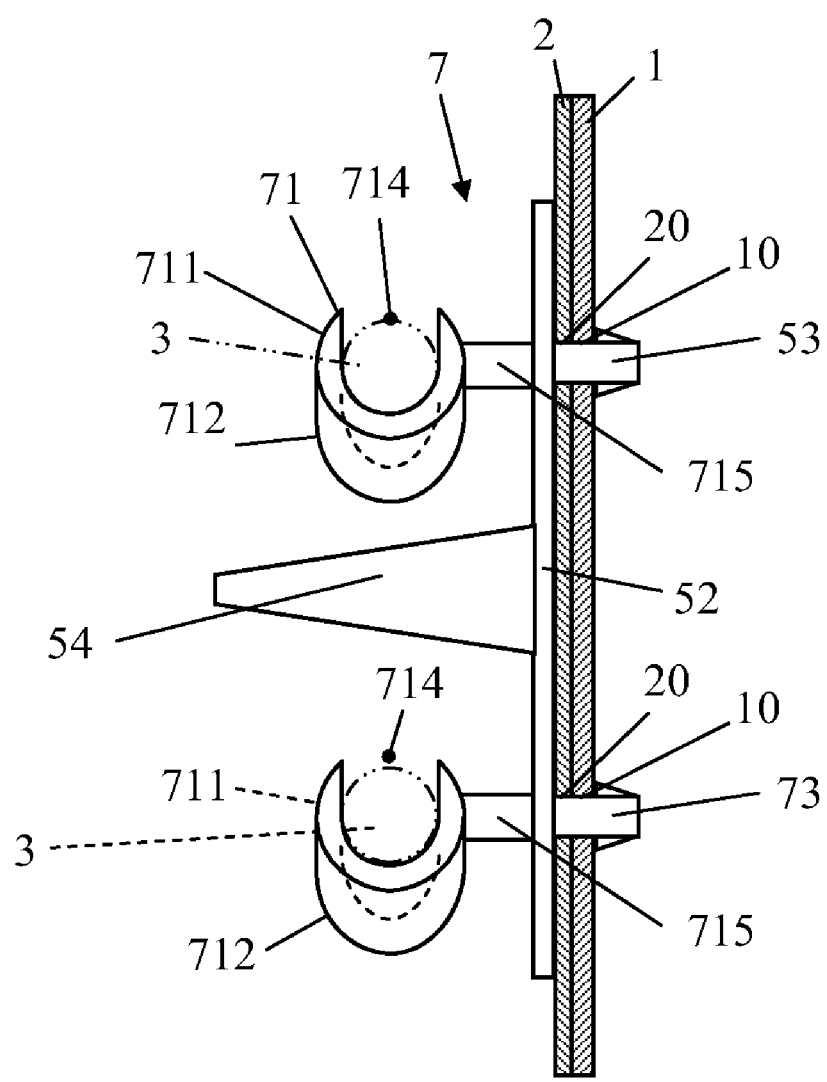
FIG. 10 is a side view of the lamp holder shown in FIG. 9.

FIG. 9 is a front view of a still another example of a lamp holder according to the present invention; FIG. 10 is a side view of the lamp holder shown in FIG. 9. A lamp holder 7 shown in FIG. 9 has the same structure as the first embodiment except that a lamp holding portion 71 is different; and detailed description of substantially the same portions is skipped.

The lamp holder 7 includes: a pair of lamp holding portions 71; a connection portion 72; and a pair of engagement portions 73. The pair of lamp holding portions 71 have a cylindrical in which part thereof is linear and the remaining part is curved. As shown in FIG. 9, the lamp holding portion 71 has a column-shape portion 715 to connect to the connection portion 72; an opening portion 714 is formed at a portion which meets a portion of the lamp holding portion 71, where the column-shape portion 715 is connected, at right angles. The lamp holding portion 71 has a C shape in section.

The lamp holding portion 71 has: a linear lamp holding portion 711 that is extended in a direction which meets an arrangement direction of the lamp holding portion 71 at right angles; and a curve-shape lamp holding portion 712 that is connected to a pair of end portions of the linear lamp holding portion 711 and formed to be curved. As shown in FIG. 10, the opening portion 714 has a width equal to the diameter of the lamp 3. The opening portion 714 is formed at an upper position in a case where a liquid crystal display device, in which the lamp holder 7 is disposed, is put into a use state. The curve-shape lamp holding portion 712 is curved toward a side opposite to the opening portion 714.

The pair of lamp holding portions 71 are formed in such a way that the linear lamp holding portion 711 has the same distance as the wide pitch P1. By disposing the lamp holder 7 in such a way that the arrangement direction of the lamp holding portion 51 meets the axis direction of the lamp 3 at right angles, it is possible to hold the lamp 3 that is disposed at the wide pitch P1.

The curve-shape lamp holding portion 712 is formed into an arc shape. A tangential line at an end portion of the curve-shape lamp holding portion 712 opposite to a portion that is connected to the linear lamp holding portion 711 is deviated from an axis direction of the linear lamp holding portion 711 by an angle θ. According to this, by inclining the lamp holder 7 by the angle θ toward the line along which the arrangement direction of the lap holding portion 71 meets the axis direction of the lamp 3 at right angles, it is possible to change the lamp pitch from the wide pitch P1 to the narrow pitch P2 without changing the distance of the lamp holding portion 71.

In the lamp holder 7 in the present embodiment, the curve-shape lamp holding portion 712 is formed along a curve; and it is possible to hold the lamp 3 at an arbitrary point on the curve. Accordingly, by rotating the arrangement direction of the lamp holding portion 71 between an angle 0 and the angle θ with respect to the line that meets the axis direction of the lamp 3 at right angles, it is possible to deal with the lamp 3 that is disposed at an arbitrary lamp pitch between the wide pitch P1 and the narrow pitch P2.

In the lamp holder 7 in the present embodiment, the gap of the opening portion 714 is so formed as to be equal to the outer diameter of the lamp 3. Accordingly, when mounting the lamp 3 to the lamp holder 7, it is not necessary to deform the lamp holding portion 71 by pushing the lamp 3 against the lamp holding portion 71, so that it is possible to curb action of an excessive stress onto the lamp 3. Besides, because the opening portion 714 faces upward when the liquid crystal display device is used, it is possible to prevent the holding of the lamp 3 from becoming loose during the use and to curb occurrence of disadvantages that the lamp 3 bends and comes off because of loose holding of the lamp 2.

Here, it is described that the curve-shape lamp holding portion 712 in the present embodiment is bent along an arc shape; however, the curve-shape lamp holding portion 712 is not limited to this, and may be bent along a curve such as a curve decided by a predetermined function, a curve decided empirically or the like.

Fourth Embodiment

Figure 11:
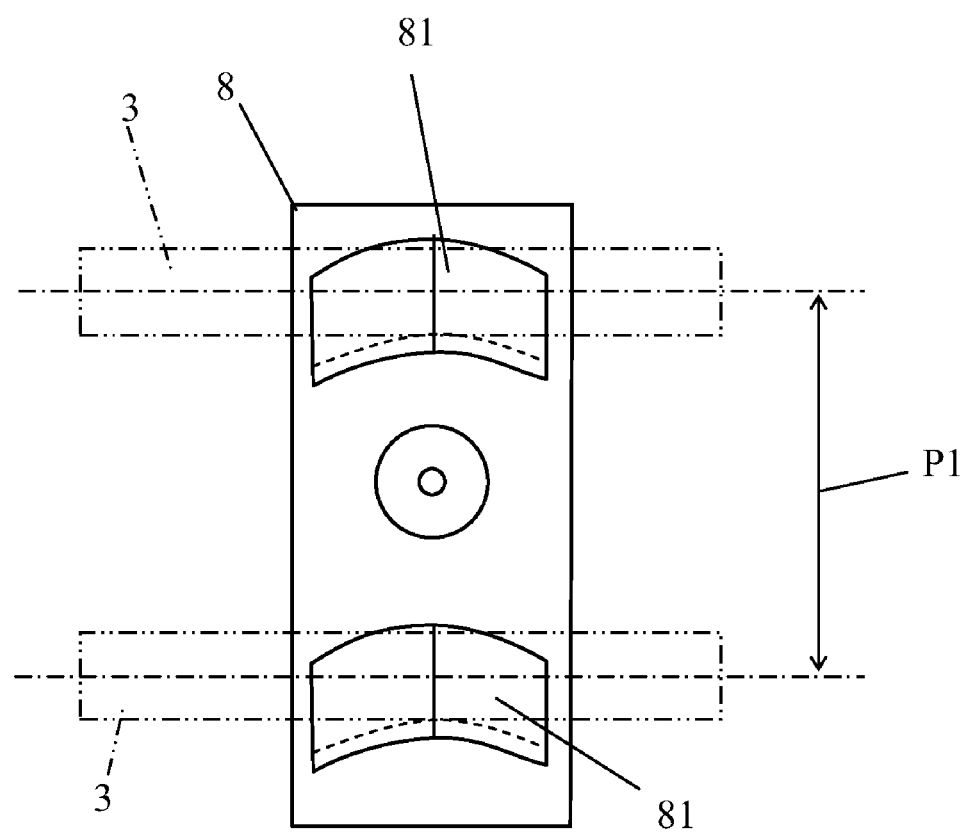
FIG. 11 is a front view of a still another example of a lamp holder according to the present invention.
Figure 12:
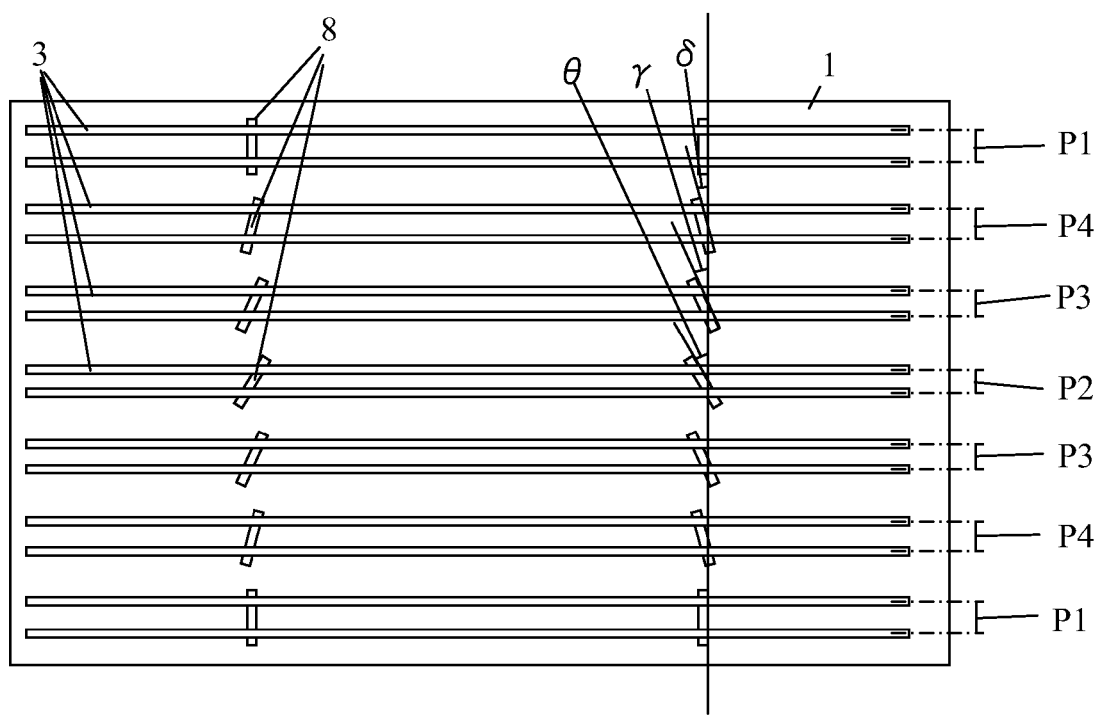
FIG. 12 is a disposition view of a backlight device showing a disposition state of a lamp holder according to the present invention.
Figure 13:
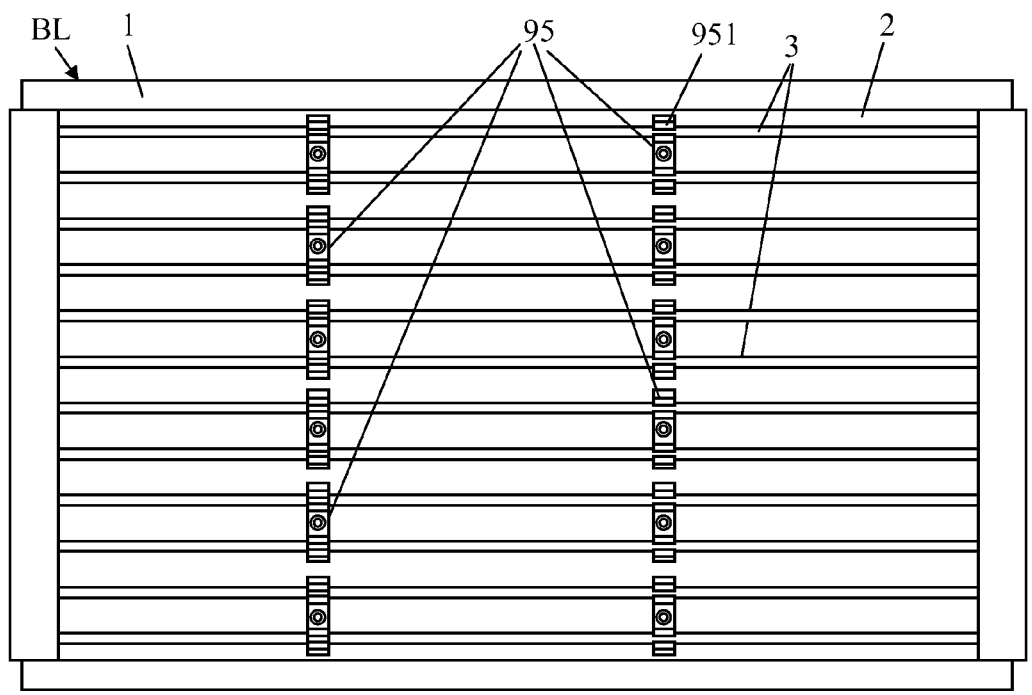
FIG. 13 is a front view showing innards of a backlight device with a front portion of a conventional liquid crystal display device omitted.
Figure 14:
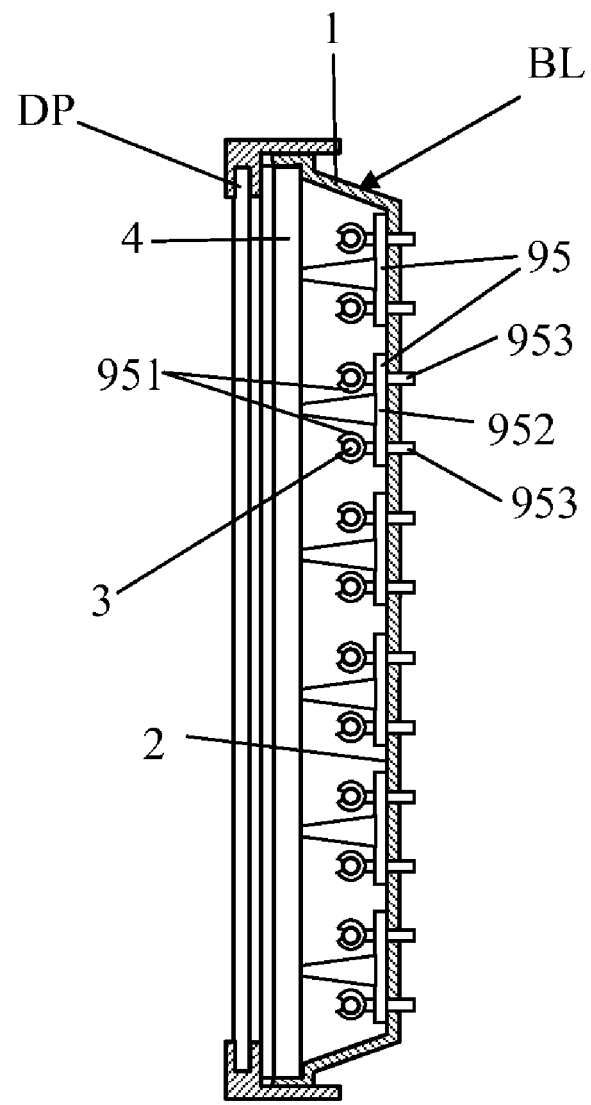
FIG. 14 is a sectional view of a conventional liquid crystal display device.

FIG. 11 is a front view of a still another example of a lamp holder according to the present invention; FIG. 12 is a disposition view of a backlight device showing a disposition state of a lamp holder according to the present invention. As shown in FIG. 11, a lamp holder 8 has the same structure as the lamp holder 7 shown in FIG. 9 except that a lamp holding portion 81 is different; and description of substantially the same portions is skipped.

As shown in FIG. 11, the lamp holding portion 81 is line-symmetrical and is a C-shape member in section. The lamp holding portion 81 is so formed as to be curved toward a side opposite to an opening portion 814. The pair of lamp holding portions 81 are formed in such a way that a tangential line at the central portion meets the arrangement direction at right angles. Besides, the lamp holding portions 81 are formed in such a way that tangential lines at both end portions are deviated in different directions by an angle θ from the tangential line at the central portion. Accordingly, by rotating the lamp holder 8 in either direction of a clockwise direction or a counterclockwise direction with respect to the arrangement direction of the pair of lamp holding portions 81 when seen from a front-surface side, it is possible to adjust the lamp pitch.

In the backlight device shown in FIG. 12, four kinds of lamp pitches are used as the lamp pitch. In other words, it is supposed that the four kinds of pitches of the wide pitch P1, the narrow pitch P2, a first intermediate pitch P3 and a second intermediate pitch P4 are used. Here, as for a reference to dispose the lamp holder 8, the arrangement direction of the pair of lamp holding portions 81 is perpendicular to the axis direction of the lamp 3. When the inclination angle of the lamp holder 8 an angle 0, the lamp pitch at which the pair of lamp holders 8 are able to hold the lamp is the wide pitch P1, the narrow pitch P2 when the inclination angle is an angle θ, the first intermediate pitch P3 when the inclination angle is an angle γ, and the second intermediate pitch P4 when the inclination angle is an angle δ.

As described above, it is possible to adjust the lamp pitch in whichever direction of the clockwise direction or the counterclockwise direction the lamp holder 8 is rotated. And, because the lamp holding portion 81 is line-symmetrical, if the rotation angle of the lamp holder 8 is the same, the lamp pitch is the same even if the rotation direction is different. By using this characteristic, as shown in FIG. 12, in the backlight device, the lamp holder 8 disposed on the right side of the central portion is rotated counterclockwise and disposed; the lamp holder 8 disposed on the left side of the central portion is rotated clockwise and disposed.

As described above, by changing the rotation direction of the lamp holder 8 disposed on the right side and the rotation direction of the lamp holder 8 disposed on the left side, it is easy for an operator to mount the lamp holder 8 by using both of the right hand and the left hand. Because of this, it is possible to expedite the working and curb occurrence of wrong mounting because the operator is not forced to take a difficult stance for the mounting.

In the above each embodiment, the example is described, in which the lamp holder holds the lamps of the backlight device that have the plurality of lamp pitches; however, the lamp holder is not limited to this, and may be used likewise for a plurality of kinds of backlight devices that are different in size and shape. For example, a backlight for a large liquid crystal display device and a backlight for a small liquid crystal display device are different in the lamp pitch from each other in many cases; and it is possible to use a lamp holder that is compatible with both of these backlight devices. Because of this, it is possible to reduce the manpower necessary for the design of the lamp holder and it becomes easy to adjust the remaining number of lamp holders, so that it is possible to eliminate wasted use materials.

In the above each embodiment, the example is described, in which the two lamp holders are used; however, the lamp holder is not limited to this, and the lamp holder may include three or more lamp holders arranged.

INDUSTRIAL APPLICABILITY

The present invention is able to be used as a liquid crystal display device and a backlight device of an image display device that has a light source on a rear surface of a liquid crystal display device and the like.

The invention claimed is:

1. A backlight comprising:
a plurality of cylindrical lamps arranged in parallel or substantially in parallel with each other;
a lamp holding member including a plurality of lamp holders that are arranged at predetermined intervals and that are arranged to hold respective ones of the plurality of cylindrical lamps, the lamp holding member also including a flat-plate shaped connection portion to which the plurality of lamp holders are fixed, the flat-plate shaped connection portion is arranged to be movable with respect to the plurality of cylindrical lamps such that, when the flat-plate shaped connection portion is moved with respect to the plurality of cylindrical lamps, a location of points of contact between the plurality of lamp holders and the plurality of the cylindrical lamps is changed; wherein
a distance between the plurality of cylindrical lamps is increased or decreased by the changing of the location of the points of contact between the plurality of lamp holders and the plurality of cylindrical lamps while the plurality of cylindrical lamps remain arranged in parallel or substantially in parallel with each other.

2. The backlight according to claim 1, wherein the plurality of lamp holders is arranged to hold the plurality of cylindrical lamp in such a way that an arrangement direction of the flat-plate shaped connection portion and a longitudinal axis direction of the plurality of cylindrical lamps meet each other at right angles.

3. The backlight according to claim 1, wherein an engagement portion arranged to mount the lamp holding member to a mounting portion is arranged to protrude at a position of a surface that is opposite to a surface of the flat plate-shaped connection portion where the plurality of lamp holders is mounted.

4. The backlight according to claim 1, wherein
the plurality of lamp holders is disposed in parallel with the flat plate-shaped connection portion and has a shape in which a plurality of linear cylindrical portions, which include cut-away portion extending in the longitudinal axis direction in a place opposite to the connection portion, are connected to each other in such a way that the plurality of linear cylindrical portions deviate from each other by a predetermined angle and intersect with each other; and
the cut-away portions of the respective cylindrical portions are connected to each other, so that an opening portion extending in a longitudinal direction of the plurality of lamp holders is defined.

5. The backlight according to claim 3, wherein
the plurality of lamp holders is disposed in parallel with the flat plate-shaped connection portion and has a shape in which a plurality of linear cylindrical portions, which include a cut-away portion extending in the longitudinal axis direction in a place opposite to the connection portion, are connected to each other in such a way that the plurality of linear cylindrical portions deviate from each other by a predetermined angle and intersect with each other; and
the cut-away portions of the respective cylindrical portions are connected to each other, so that an opening portion extending in a longitudinal direction of the plurality of lamp holders is defined.

6. The backlight according to claim 4, wherein
the plurality of lamp holders has a shape in which two cylindrical portions, which have an inner diameter equal to an outer diameter of the plurality of cylindrical lamps, are connected to each other in such a way that the two cylindrical portions deviate from each other by a predetermined angle and intersect with each other.

7. The backlight according to claim 5, wherein
the plurality of lamp holders has a shape in which two cylindrical portions, which have an inner diameter equal to an outer diameter of the plurality of cylindrical lamps, are connected to each other in such a way that the two cylindrical portions deviate from each other by a predetermined angle and intersect with each other.

8. The backlight according to claim 4, wherein
at least one of the plurality of cylindrical portions has an inner diameter smaller than an outer diameter of the plurality of cylindrical lamps; and
the inner diameter of the at least one of the plurality of cylindrical portions is so small as not to allow a stress, which acts on the plurality of cylindrical lamps because of deformation of the plurality of lamp holders, to cause trouble with the plurality of cylindrical lamps.

9. The backlight according to claim 5, wherein
at least one of the plurality of cylindrical portions has an inner diameter smaller than an outer diameter of the plurality of cylindrical lamps; and
the inner diameter of the cylindrical portion is so small as not to allow a stress, which acts on the plurality of cylindrical lamps because of deformation of the plurality of lamp holders, to cause trouble with the plurality of cylindrical lamps.

10. The backlight according to claim 1, wherein
the plurality of lamp holders includes a cylindrical portion including at least one end portion which is curved and which is disposed in parallel with the connection portion, and which further includes an opening portion on an opposite side with respect to the curved direction.

11. The backlight according to claim 3, wherein
the plurality of lamp holders includes a cylindrical portion including at least one end portion which is curved and which is disposed in parallel with the connection portion, and which further includes an opening portion on a side opposite to the bent direction.

12. The backlight according to claim 10, wherein
end portions of the plurality of lamp holders are curved in such a way that the plurality of lamp holders becomes line-symmetrical with respect to a central portion thereof.

13. The backlight according to claim 11, wherein
end portions of the plurality of lamp holders are curved in such a way that the plurality of lamp holders becomes line-symmetrical with respect to a central portion thereof.

14. The backlight described in claim 3, wherein
a shield to which the lamp holding member is fixed and a light reflection portion disposed on a front-surface side of the shield are provided with an engagement hole arranged to permit mounting of the engagement portion; and
the engagement holes of the shield and the light reflection portion are arranged in a direction inclined to a longitudinal axis direction of the plurality of cylindrical lamps so as to match an interval between the lamps.

15. A liquid crystal display device comprising the backlight device described in claim 1.

16. A liquid crystal display device comprising the backlight described in claim 14.

* * * * *